United States Patent [19]

Shaw et al.

[11] Patent Number: 5,919,039
[45] Date of Patent: Jul. 6, 1999

[54] OVENS

[75] Inventors: Simon Henry Shaw; Robert Mitchell Rolston, both of High Wycombe, United Kingdom

[73] Assignee: United Biscuits (UK) Limited, United Kingdom

[21] Appl. No.: 08/913,964

[22] PCT Filed: Mar. 27, 1996

[86] PCT No.: PCT/GB96/00728

§ 371 Date: Dec. 15, 1997

§ 102(e) Date: Dec. 15, 1997

[87] PCT Pub. No.: WO96/29876

PCT Pub. Date: Oct. 3, 1996

[30] Foreign Application Priority Data

Mar. 28, 1995 [GB] United Kingdom .................. 9506337

[51] Int. Cl.⁶ .............................. F27B 9/06; F27B 9/00
[52] U.S. Cl. ...................... 432/121; 219/388; 432/243; 392/416
[58] Field of Search ..................... 432/121, 243, 432/239, 11; 219/388, 412, 43; 392/416, 417

[56] References Cited

U.S. PATENT DOCUMENTS

| | | | |
|---|---|---|---|
| 2,367,429 | 1/1945 | Rauen ....................................... | 432/144 |
| 3,568,693 | 3/1971 | Vandrey ..................................... | 137/1 |
| 4,275,647 | 6/1981 | Chambers et al. ......................... | 99/339 |
| 4,276,465 | 6/1981 | Flavio ....................................... | 219/388 |
| 4,394,121 | 7/1983 | Wakamiya et al. ....................... | 432/11 |
| 4,876,426 | 10/1989 | Smith .................................... | 219/10.55 |
| 4,906,105 | 3/1990 | Geake . | |
| 5,134,263 | 7/1992 | Smith et al. ........................... | 219/10.55 |
| 5,197,375 | 3/1993 | Rosenbrock et al. . | |
| 5,528,017 | 6/1996 | Wolff ....................................... | 219/501 |
| 5,648,042 | 7/1997 | Miller et al. .............................. | 266/44 |

FOREIGN PATENT DOCUMENTS

| | | |
|---|---|---|
| 0 081 352 | 6/1983 | European Pat. Off. . |
| 2 126 719 | 2/1972 | France . |
| 456 493 | 4/1967 | Switzerland . |
| 1 324 892 | 7/1973 | United Kingdom . |
| 2 094 513 | 12/1984 | United Kingdom . |
| 2 183 346 | 7/1990 | United Kingdom . |

Primary Examiner—Teresa Walberg
Assistant Examiner—Krishan Pasrija
Attorney, Agent, or Firm—Millen, White, Zelano, & Branigan, P.C.

[57] ABSTRACT

A tunnel oven contains a plurality of transversely extending radiant heating elements 17, 18 arranged at intervals along the length of the oven 1, the oven 1 being provided with conveyor band 10 for transporting material to be heated through the oven radiant heating elements 17, 18 supplying thermal energy, a sensing tube 31, 32 which extends within the oven 1 over a part of the length of the oven 1 that contains at least two radiant heating elements 17 or 18 that are spaced from each other along the length of the oven 1, the sensing tube 31 or 32 being arranged to absorb radiation from the said at least two heating elements 17 or 18 with pump 34 for causing a liquid to flow through the sensing tube 31 or 32 at a controlled rate with thermocouple junctions 35, 36 for producing a signal that provides a measure of the temperature increase of the liquid resulting from its passage through the sensing tube 31, 32 within the oven, and control means 29, 30 and with processor 29 and valve controller 30 arranged to control the rate of emission of radiant heat by a radiant heating element or elements 17, 18 in accordance with the signal.

21 Claims, 7 Drawing Sheets

OVENS

This invention relates to ovens of the kind that are suitable for use in continuous processes in which material to be heated (which may be in the form of discrete articles) is transported through the oven and is heated progressively during its passage through the oven. Such ovens are known as tunnel ovens because they are elongate and have at one end an entrance through which the material is introduced into the oven and, at the other end, an exit through which the material is withdrawn. Tunnel ovens are used for a variety of purposes, for example, to dry material or to effect the baking of food products.

For many applications, it is important to control accurately the thermal conditions to which material is subject during its passage through a tunnel oven. Accurate control is especially important when the oven is used to bake food products. Accordingly, although the invention is not limited either to the use of tunnel ovens for the baking of food products, for example, biscuits, or to tunnel ovens that are suitable for that purpose, it is convenient to discuss the matter in terms of the operation of a tunnel oven in a continuous process for the production of discrete baked food products.

When a tunnel oven is used to effect the baking of food products, baking proceeds progressively as the articles move through the oven. The length of time for which the articles are baked depends both on the path length of the articles within the oven and on the speed at which they are conveyed through it. The extent of the baking will, of course, also depend on the rate at which heat is transferred to the articles while they are in the oven.

It will be appreciated that, if a commercial baking process is to be successful, the baking conditions must be very carefully controlled. Not only must the baking conditions for a given article be kept within strict limits, but there must be a high degree of uniformity in the baking of all the articles of a given run.

The correct baking conditions for a particular kind of article having been established within a tunnel oven, it might be supposed that it would suffice simply to leave the settings of all the oven controls unchanged, but that is not so. A variety of things can necessitate changes in settings. For example, ovens are commonly provided with inspection windows at intervals along their length and, when an inspection window is opened, it will affect the conditions prevailing within the oven. A more serious problem arises when a run is interrupted.

If for any reason it proves impossible to maintain the supply of unbaked articles to the oven, or if the supply of unbaked articles has to be stopped because of a problem with the handling of the baked articles leaving the oven, for example, a failure of packaging equipment, then the run is interrupted. If, while the run is interrupted, the settings of the oven controls are left unchanged, the temperature within the oven will rise and, when the run is started again, the articles will be overbaked until the conditions settle down. The overbaked articles will not be acceptable, and there may be considerable wastage. The reason why stopping the supply of articles causes the temperature within the oven to rise is that the articles enter the oven at a relatively low temperature and leave it at a relatively high temperature, so that they act as heat sinks.

The problems that arise when a run is interrupted manifest themselves even more severely, but usually much less frequently, when an oven is started up after having been shut down, for example, for cleaning and maintenance, and also when a run with one type of article comes to an end and a run with a different type of article is started. It will be appreciated that articles of different types will generally require different baking conditions and they may also have different cooling effects.

With a view to avoiding problems of the kind referred to, many tunnel ovens used for baking food products are provided with an automatic control system, which is arranged to control the relevant settings in response to signals from one or more temperature sensors located within the oven.

In tunnel ovens, the articles may be heated in one or other of two basically different ways: by radiation and by convection.

In what may be termed a radiation oven, radiant heating elements are provided within the oven chamber, and the articles are heated primarily by direct radiant heat transfer from the radiant heating elements to the articles. The gas within the oven (which will usually be air having, when the radiant heating elements are burners, combustion products mixed with it) will become hot, so that there will be some convective heating, and steps may be taken to promote that. Also, the walls of the oven will tend to become hot, and radiation emitted by the walls will also contribute to the heating of the articles. It is, however, only the rate of emission of radiation by the radiant heating elements that can be controlled directly.

In what may be termed a convection oven, on the other hand, either gas is heated outside the oven and then supplied to it or it is heated within the oven in a way that does not result in the incidence on the articles of a significant flux of direct thermal radiation. The walls of the oven will tend to become hot, and radiation from the walls will contribute to the heating of the articles, but that contribution will usually be small by comparison with the convective heating of the articles by the hot gas. The heat required to produce the hot gas is commonly, but not necessarily, produced by combustion and, when it is so produced, the hot combustion products may themselves constitute at least a part of the hot gas within the oven. Alternatively, where the combustion takes place outside the oven, the hot combustion products may be used to heat another gas, which is commonly air, by means of a heat exchanger. Only the other gas, and not the combustion products are then supplied to the oven.

In a convection oven, if the relative velocity between the gas within the oven and the articles is maintained approximately constant, then the temperature of the gas within the oven will provide a good measure of the net transfer of heat to the articles, and a control system that uses that temperature as an input can be made to give reasonably accurate control. In a radiation oven, on the other hand, convection heating supplies only a minor part of the heat transferred to the articles, even when special steps are taken to promote convection heating. Accordingly, in a radiation oven, the temperature of the gas in the oven is a less satisfactory parameter on which to base control of the oven.

For purposes of research and development, measurements have been made of the net radiant "heat flux" incident on, and absorbed by, blackened test surfaces located within a radiation oven. From such measurements the degree of radiant heating of articles within radiation ovens can be estimated. Further, it has recently been suggested that means for effecting such measurements, which include a small blackened copper sphere on which the radiation is incident, could be substituted for gas temperature sensors, which are commonly thermocouple junctions, in control systems for radiation ovens.

In a radiation oven, the radiant heating elements are usually of elongate form and so mounted that they extend across the width of the oven at intervals along the length of the oven. The radiant heating elements are commonly burners, to which a combustible fluid (usually, a gas) and air are supplied. The combustible mixture emerging from a burner, once it has been ignited, burns to form a flame, and it is either the flame or, where it is provided, a ceramic element heated by the flame, from which heat is radiated to the articles. Other forms of radiant heating element may, however, be used. Thus, for example, the radiant heating elements, or some of them, may take the form of electrical resistance heaters.

The main variable to be controlled in a radiation oven is the heat output of the radiant heating elements, including the possibility that one or more elements will be cut out so that they supply no heat to the oven. Where the radiant heating elements are burners, the heat output is changed by varying the rate of supply of combustible fluid to the burners (including reducing the rate of supply to zero). In that way, both the dimensions of the flames (and hence, at least in the absence of ceramic elements, the magnitude of the radiating areas), and the temperature of the flames may be varied. With electrical resistance heaters, the temperature of the elements is varied by changing the magnitude of the electric current through the elements. A control system will allow the heat output of the elements to be controlled individually and/or in blocks.

The invention provides a tunnel oven containing a plurality of transversely extending radiant heating elements arranged at intervals along the length of the oven, the oven being provided with means for transporting material to be heated through the oven, means for supplying energy to the radiant heating elements, a sensing tube which extends within the oven over a part of the length of the oven that contains at least two radiant heating elements that are spaced from each other along the length of the oven, the sensing tube being arranged to absorb radiation from the said at least two heating elements, means for causing a liquid to flow through the sensing tube at a controlled rate, means for producing a signal that provides a measure of the temperature increase of the liquid resulting from its passage through the sensing tube within the oven, and control means arranged to control the rate of emission of radiant heat by a radiant heating element or elements in accordance with the signal.

When the oven, which is a radiation oven, is in operation, the rise in temperature of the liquid flowing through a sensing tube provides a measure of the radiation flux that is incident on the tube, and hence a measure of the radiation flux over at least a part of the length of the oven that is sufficiently great to contain at least two of the radiant heating elements. As is explained in more detail below, the signal that provides a measure of that temperature increase provides a better parameter on which to base control of the oven than would not only a signal providing a measure of gas temperature within the oven, but also a signal providing a measure of the radiation flux at a point (strictly, over a small area not extending over a significant part of the length of the oven).

The radiant heating elements may be situated above the path along which, in use, the material is transported through the oven, the said sensing tube being then situated below the radiant heating elements and above the path along which, in use, material to be heated is transported through the oven. Advantageously, there is provided an additional, lower set of transversely extending radiant heating elements arranged at intervals along the length of the oven, the lower radiant heating elements being situated below the path along which, in use, material to be heated is transported through the oven, and wherein there is provided an additional, lower sensing tube situated above the lower radiant heating elements and below the path along which, in use, material to be heated is transported through the oven, and the lower sensing tube extends over a part of the length of the oven that contains at least two lower radiant heating elements, the lower sensing tube being arranged to absorb radiation from the said at least two lower radiant heating elements, means for causing a liquid to flow through the sensing tube at a controlled rate, means for producing a signal that provides a measure of the temperature increase of the liquid resulting from its passage through the lower sensing tube within the oven, and control means arranged to control the rate of emission of radiant heat by a lower radiant heating element or lower radiant heating elements. The rises in temperature of the liquid flowing through the upper and lower sensing tubes are then determined mainly by the radiant heat output of the upper and lower radiant heating elements, respectively. Preferably, there are provided a plurality of upper sensing tubes and a plurality of lower sensing tubes, the upper sensing tubes and the lower sensing tubes being distributed along the length of the oven, and there being provided means for causing a liquid to flow through all the sensing tubes, means for producing a signal indicative of the temperature rise in the liquid in each of the sensing tubes, and means for controlling the output of the radiant heating elements in accordance with the signals.

When there are provided a plurality of upper sensing tubes and a plurality of lower sensing tubes, then preferably the upper sensing tubes together extend over substantially the entire length of the oven, and the lower sensing tubes together extend over substantially the entire length of the oven.

Advantageously, when there are provided at least one upper sensing tube and at least one lower sensing tube, the outer surface of the or each upper sensing tube is radiation-absorbing above and radiation-reflecting below, and the outer surface of the or each lower sensing tube is radiation-absorbing below and radiation-reflecting above. Instead, the or each upper sensing tube may be provided with means arranged to shield it against radiation that would be incident on it from below, and the or each lower sensing tube may be provided with means arranged to shield the sensing tube against radiation that would be incident upon it from above. With either of those arrangements, the temperature rise in the liquid flowing through the or each upper sensing tube is determined mainly by the radiant heat output of the upper radiant heating elements, but also partly by radiation from the roof of the oven (the top portion of the wall of the oven), and correspondingly for the or each lower sensing tube and the lower radiant heating elements.

It is usual to regard the oven as being made up of a number of zones, each extending over the entire transverse cross-sectional area of the oven and over a part of the length of the oven. The extent of any given zone is determined by the fact that the power supply to all the radiant heating elements within the zone cannot be varied independently of one another, except that it may be possible to cut off entirely the power supply to some only of the elements in a zone. When the oven can be regarded as being made up of such zones, it is preferable to provide at least one upper sensing tube and at least one lower sensing tube in each zone.

For many applications, especially the baking of food products, it is advantageous that the or each sensing tube extends, as seen in plan, in a direction that is at an angle to the direction of movement of the material to be heated through the oven. If a sensing tube extends parallel to the direction in which the material is transported through the oven, then the inevitable shielding of thermal radiation by a sensing tube can result in a noticeably uneven heating of material that passes directly beneath an upper sensing tube or above a lower sensing tube. If, as is the case with the baking of food products in the form of discrete articles, the material has a low thermal conductivity and uniform heating is important, it is especially desirable to reduce the localised shielding effect on any individual article by the or each sensing tube.

The or each sensing tube may enter the oven at one side, extend diagonally across the oven, and leave the oven at the other side. Advantageously, however, the or each sensing tube enters the oven at one side, extends along a part of the length of the oven and across at least a part of the width of the oven and returns substantially parallel to itself to leave the oven at the said one side. With the latter configuration of sensing tube, the increase in the temperature of the liquid flowing through the tube is more nearly a measure of the radiation flux incident on the sensing tube averaged (without weighting) over the length of the part of the oven over which the sensing tube extends.

Advantageously, the means for producing a signal that provides a measure of the temperature increase of the liquid resulting from its passage through the or each sensing tube within the oven comprises thermocouple means.

Preferably, a plurality of sensing tubes is provided, each sensing tube being situated between (in a vertical direction) a group of adjacent radiant heating elements, and the path along which, in use, the material is transported through the oven, so that each sensing tube is associated with a group of radiant heating elements, and the control means is arranged to control the rate of emission of radiant heat by the radiant heating elements of each group of radiant heating elements in response to the signal that provides a measure of the temperature increase of the liquid that flows through the sensing tube with which those radiant heating elements are associated.

Advantageously, the means for transporting material through the oven is an endless band, the upper run of which extends through the oven and along the length of the oven and which provides a supporting surface for the material. The band may be imperforate, or it may be a mesh or be otherwise perforate.

It is usually preferable that the radiant heating elements are burners. Then, the energy that is supplied to the radiant heating elements is the energy of combustion of the combustible mixture that is supplied to the burners.

The invention also provides a method of heating material, which comprises conveying the material through a tunnel oven in accordance with the invention.

The method is especially useful when the material is a food material, and the heating effects baking of the material Several forms of tunnel oven, each suitable for baking biscuits and constructed in accordance with the invention, will now be described by way of example with reference to the accompanying drawings, in which:

Figure 1:
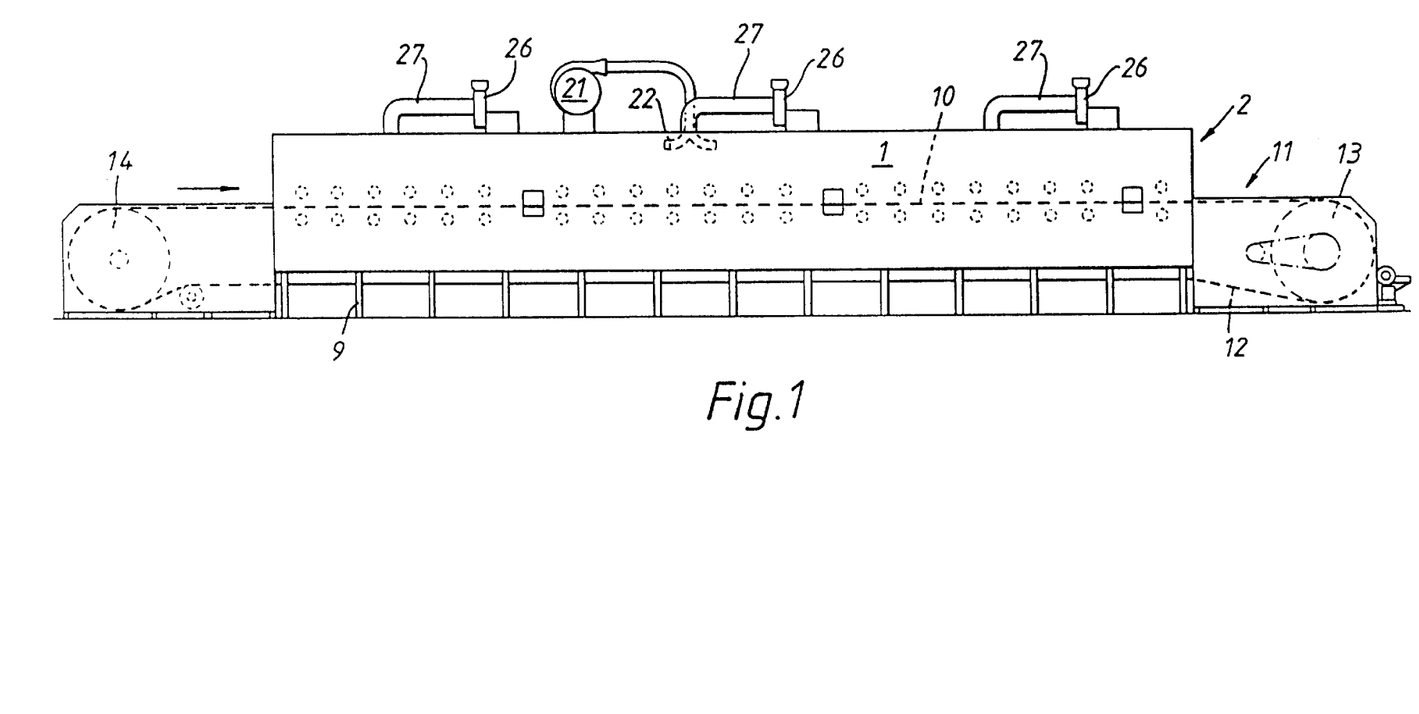
FIG. 1 is a diagrammatic side view of one form of oven, with some components omitted in the interests of clarity.
Figure 2:
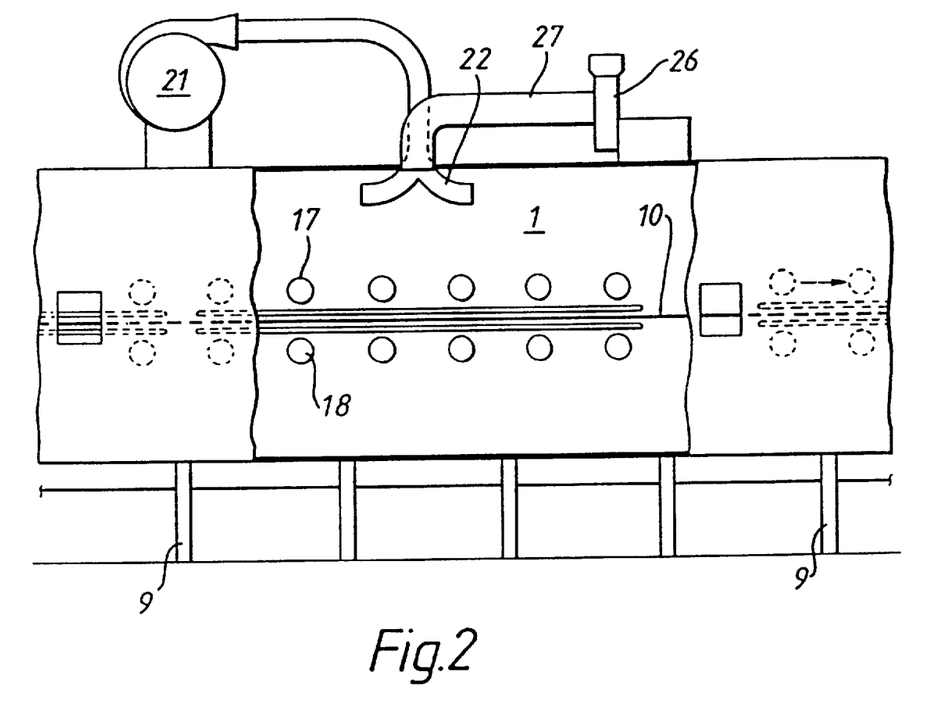
FIG. 2 is a diagrammatic side view of a part of the oven shown in FIG. 1, with part of the oven wall cut away and on a larger scale than FIG. 1.
Figure 3:
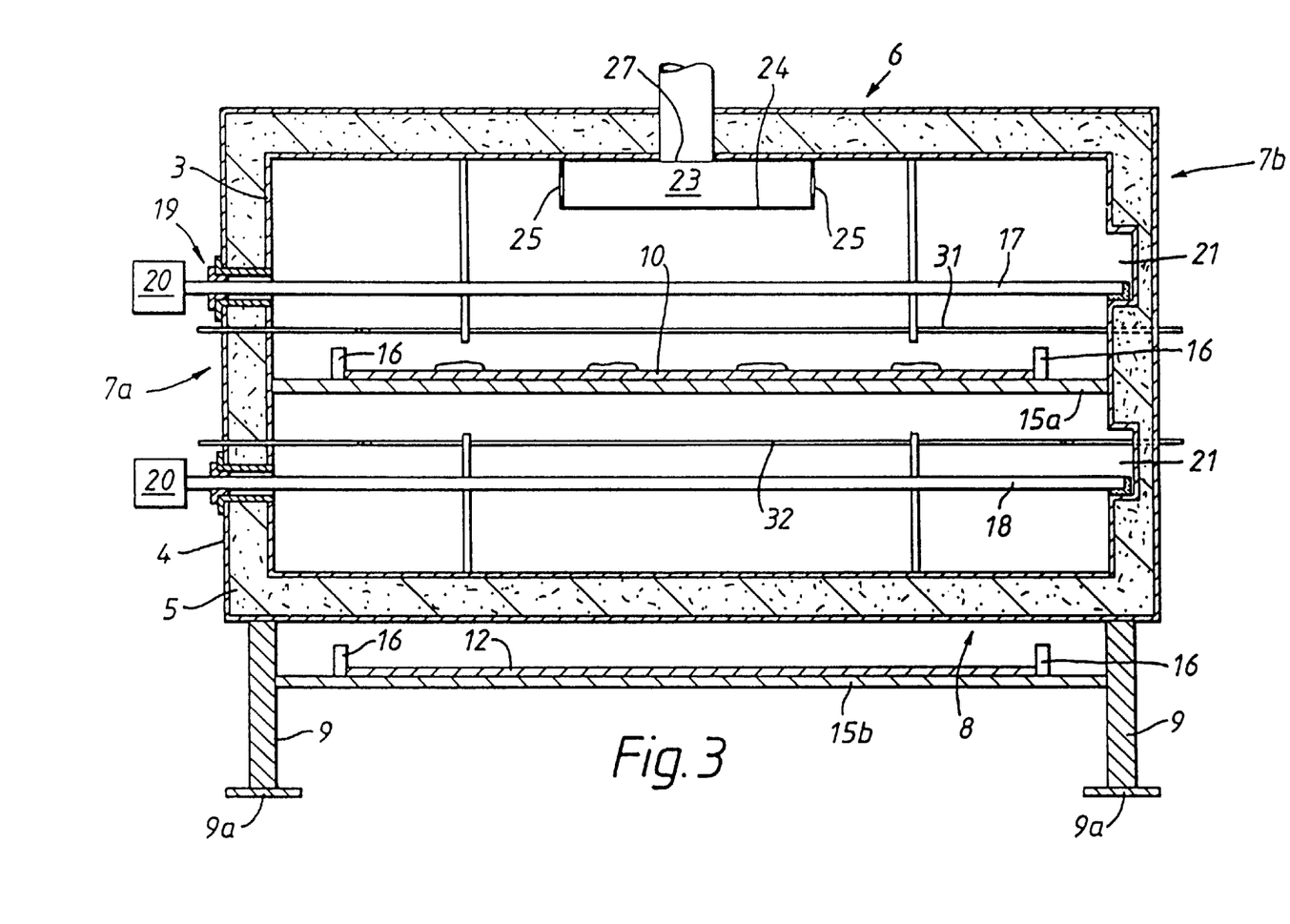
FIG. 3 is a transverse cross-section taken through the oven shown in FIGS. 1 and 2, and on a larger scale than FIG. 2.

Referring to FIGS. 1, 2 and 3 of the accompanying drawings, the tunnel oven comprises an elongate baking chamber, which is indicated generally by the reference numeral 1. The chamber 1, which is open at each end, is bounded by a wall indicated generally by the reference numeral 2.

The oven wall 2 is (see FIG. 3) of double construction, comprising an inner skin 3 and an outer skin 4. The cavity between the inner skin 3 and the outer skin 4 contains a thermally insulating material 5. The oven wall 2 has a top portion (which constitutes the roof of the oven), two side portions and a bottom portion (which constitutes the floor of the oven), which are indicated generally (see FIG. 3) by the reference numerals 6, 7a, 7b and 8, respectively. The oven wall 2 is supported by legs 9 provided with feet 9a (see FIG. 3). In practice, the loads from the legs 9 are not fed directly into the wall 2 as shown in FIG. 3, but rather into a cradle (not shown) or other form of load-spreading and strengthening means.

Extending through the oven chamber 1, and along its length, is the upper run 10 of an endless conveyor band, which is indicated generally by the reference numeral 11. The lower, return, run 12 of the conveyor band 11 passes beneath the bottom portion 8 of the oven wall 2, and hence outside the oven chamber 1. Beyond the ends of the oven, the conveyor band 11 runs round a driven roller 13 at one end and an idler roller 14 at the other end.

Between the driven roller 13 and the idler roller 14, the conveyor band 11 runs (see FIG. 3) over support members 15a and 15b, which are situated immediately beneath, and at intervals along the lengths of, the upper run 10 and the lower run 12 of the conveyor band, respectively. The upper support members 15a extend between the side portions 7a and 7b of the oven wall 2, while the lower support members each extend between two oven legs 9 situated on opposite sides of the oven. Extending upwardly from some of the support members 15a and 15b are two idler rollers 16, which are mounted with their axes vertical and so as to be freely rotatable about their axes. The idler rollers 16 are so situated towards the ends of support members 15a and 15b that they are in contact with the edges of the band 11. Thus, the idler rollers 16 on upper support members 15a serve to locate laterally the upper run 10 of the band 11, and the idler rollers 16 on lower support members 15b perform the same function for the lower run 12 of the band.

Extending transversely through the oven chamber 1 are upper and lower radiant heating elements in the form of tubular burners, which are indicated by the reference numerals 17 and 18, respectively.

Figure 16:
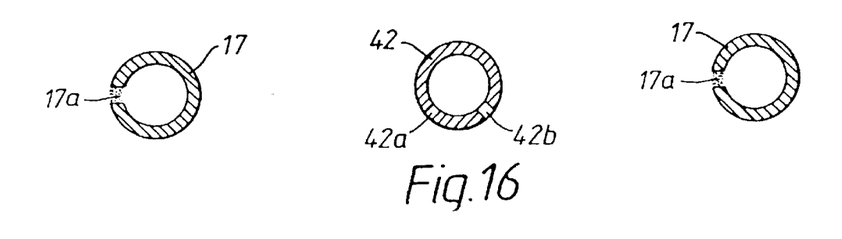
FIG. 16 is a cross-section (not to scale) taken through two burner tubes and an associated convection-promoting element.

Each of the upper burners 17 consists of a tube which extends across the width of the oven chamber 1, is closed at one end, and has, extending along one side, a row of apertures. The apertures may, for example, be formed by having a slit that, within the oven chamber 1, extends along the length of the burner 17 on one side, and by providing within the slit a material, for example, expanded metal 17a (see FIG. 16), that divides the mouth of the slit into a plurality of discrete apertures.

Each upper burner 17 is inserted into the oven chamber 1 through an aperture in the side wall 7a (see FIG. 3), where the burner is mounted by means which is indicated generally by the reference numeral 19. Outside the oven chamber 1, the burner 17 is provided with an injector and valve assembly which is shown schematically at 20 for effecting the supply of a combustible gaseous mixture to the burner. The valve of the assembly 20 is used to shut off the supply of combustible gas to the injector of the assembly and hence to the associated burner. In operation, compressed air is supplied to the injector where it entrains the combustible gas to form the combustible mixture that is fed to the burner 17. At the end remote from the assembly 20, the burner tube 17 is closed and a portion of the burner 17 adjacent to that end is supported, for example, by a step in the side wall 7b of the oven, which step forms the bottom of a vertically extending slot 21 formed in the side wall 7b.

The lower burners 18 are of the same form as, and are mounted in the same way as, the upper burners 17. The lower burners 18 are also provided with injector and control valve assemblies 20.

A compressor 21 for supplying air under pressure to the burners 17 and 18 is mounted on top of the oven. The outlet from the compressor 21 is connected to the injectors of the assemblies 20 associated with the burners 17 and 18 by a manifold of which a part only is shown at 22 (see FIGS. 1 and 2).

The manifold 22 is provided with six control valves (not shown), of which three control the rate of supply of compressed air to the injectors of the assemblies 20 associated with the upper burners 17 in each of the three zones (which zones are described below), and the other three control the rate of supply of compressed air to the injectors of the assemblies associated with the lower burners 18 in each of the three zones. Provided that the valve of an assembly 20 is open, so that combustible gas is supplied to the injector of the assembly, the rate at which a combustible gaseous mixture is supplied to the associated burner 17 or 18 is determined by the rate of supply of compressed air to the injector of the assembly. Thus, the rate of heat output of, say, the upper burners 17 in one zone, is determined (assuming that the supply of combustible gas to any one or more of them has not been shut off) by the setting of the relevant control valve in the manifold 22.

Extending along the length of the oven is a plenum chamber 23, which is bounded by the roof 6 of the oven and a channel-shaped member 24 (see FIG. 3). The plenum chamber 23 is in communication with the oven chamber 1 through apertures 25 formed in the side walls of the channel-shaped member 24 and arranged at intervals along the length of the plenum chamber. By means of two transversely extending partitions (not shown), the plenum chamber is divided into three compartments, and three extractor fans 26, one for each compartment, are mounted on the top of the oven. The inlet to each of the extractor fans 26 is in communication with the associated compartment of the plenum chamber 23 by means of a pipe 27, which passes through the top portion 6 of the oven wall 2.

The oven is provided with a control system. The main variables to be controlled are the settings of the control valves in the manifold 22, which determine the rate of supply of compressed air to the injectors of the assemblies and hence the rate of supply of a gaseous combustible mixture to the burners 17 and 18, and also the settings (open or shut) of the valves of the assemblies 20. A manual control is provided to enable the rate of extraction of gas from the oven chamber 1 to be controlled by varying the settings of dampers provided at the inlets of the extractor fans 26. A manual control is also provided to enable the speed at which the endless band 11 travels to be varied, for example, to take account of the different baking times required for different products.

Figure 15:
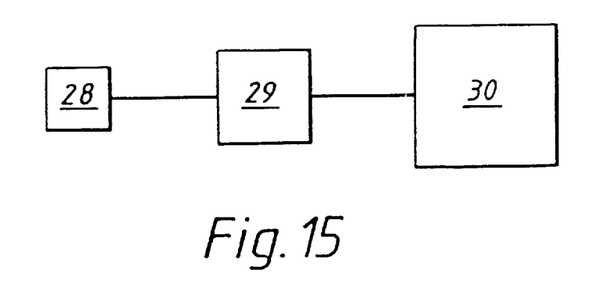
FIG. 15 is a block diagram of the control means.

The control system (see FIG. 15) can be regarded as being made up of three parts: sensing means 28 for sensing the thermal conditions prevailing within the oven chamber 1, processing means 29 for processing the signals provided by the sensing means, and operating means 30, which controls the rate of supply of combustible gaseous mixture to the burners 17 and 18.

For control purposes, the oven chamber 1 can be regarded as being divided into three zones, which are separated from one another by imaginary planes that each contain a different one of the central planes of the transverse partitions (not shown) in the plenum chamber 23. Thus, associated with each zone are the extractor fan 26 that extracts gas from the part of the plenum chamber 23 that is within the zone, and also the burners 17 and 18 that are within the zone.

As is explained hereinafter, the sensing means 28 is arranged to sense separately the conditions that obtain within each of the three zones. Further the sensing means 28 is arranged to provide separate output signals for the region of each zone that lies above the upper run 10 of the band 11 and for the region of each zone that lies below the upper run of the band. The sensing means 28 does not measure differences in the thermal conditions between discrete points within each zone, but rather provides signals that are representative of the thermal conditions that obtain over the length (in the direction of travel of the band 11) of the upper and lower regions of the zone, that is to say, the regions above and below, respectively, the upper run 10 of the band.

In the interests of clarity, the sensing means 28 is not shown in FIG. 1 but, referring to FIGS. 2 and 3, the sensing means for each zone comprises an upper sensing tube 31 and a lower sensing tube 32. In each zone, the upper sensing tube 31 is situated between the upper burners 17 and the upper run 10 of the conveyor band 11, while the lower sensing tube 32 is situated between the upper run of the conveyor band and the lower burners 18. The sensing tubes 31 and 32 are made of stainless steel, and their outer surfaces are polished to enhance their reflectivity. The portions of the outer surfaces of the tubes 31 and 32 that lie above (in the case of the upper tubes 31) or below (in the case of the lower tubes 32) the axes of the tubes are chemically blackened to render them good absorbers of radiation, as shown at 31a in FIG. 6.

The sensing tubes 31 and 32 each extend across the entire width of the oven chamber 1 and along substantially the entire length of the zone in which they are situated. The sensing tubes 31 and 32 each have the same configuration when seen in plan, that configuration for one of the upper sensing tubes 31 being shown in FIG. 4. The positions of the upper burners 17 in the zone are indicated schematically by the lines 33.

Referring again to FIG. 4, a pump indicated schematically at 34 is arranged to pump a liquid through the upper sensing tube 31 (and also through the adjacent lower sensing tube 32) at a constant rate, and two thermocouple junctions 35 and 36 are provided to sense the temperature of the liquid in the sensing tube close to the inlet and outlet ends of the tube, respectively. The lower sensing tubes 32 are each provided with thermocouple junctions (not shown) corresponding to the thermocouple junctions 35 and 36 of the upper sensing tubes 31.

The sensing means 28 thus consists of the upper and lower sensing tubes 31 and 32, respectively, the pumps 34 and the thermocouple junctions 35 and 36. The thermocouples containing the junctions 35 and 36 provide the signals that are processed by the processing means 29. The operating means 30, which acts in response to the signals after they have been processed by the processing means 29, consists of the control valves in the manifold 22, the valves of the assemblies 20, together with appropriate means for setting the control valves in response to the processed signals. The processing means 29 and the operating means 30 may together be regarded as constituting control means for controlling the rate at which radiant heat is emitted by the burners (or the flames issuing from them) in response to the signals provided by the sensing means 28.

Figure 7:
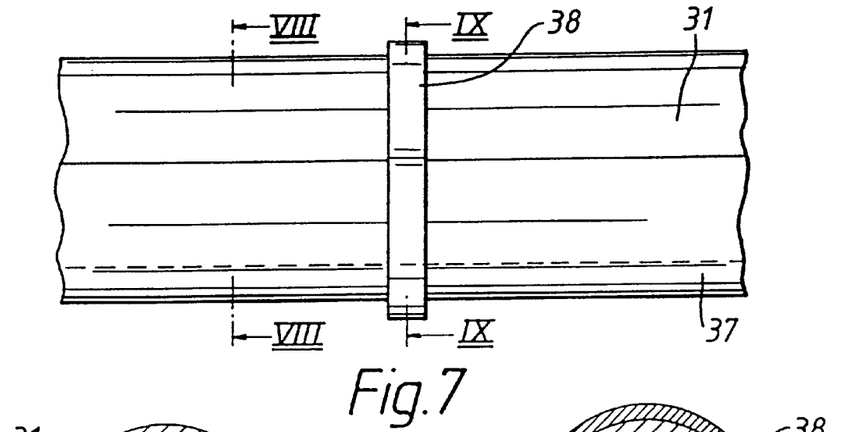
FIG. 7 is a side view, on the same scale as FIG. 6, of a part of another form of sensor tube assembly.
Figure 8:
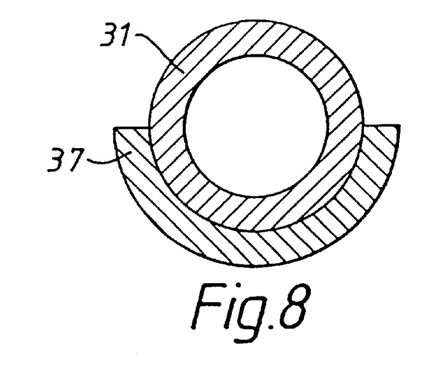
FIG. 8 is a cross-section taken on the line VIII—VIII of FIG. 7.
Figure 9:
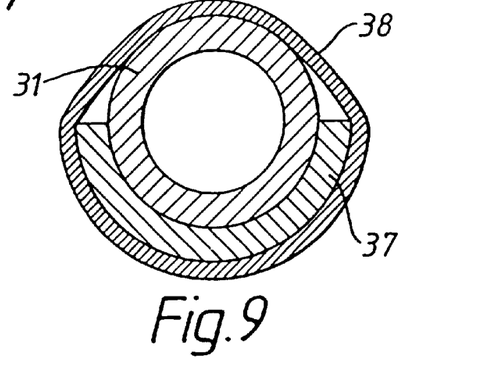
FIG. 9 is a cross-section taken on the line IX—IX of FIG. 7.

Referring to FIGS. 7, 8 and 9, each of the upper sensing tubes 31 may, instead of (or in addition to) being externally blackened over only the upper part of its outer surface, be provided with a hemi-cylindrical metal shielding member 37, which has a reflective outer surface and which extends along the length of the underside of the tube. At intervals along the length of the upper sensing tube 31, the shielding member 37 is held in position by a metal strap 38 which surrounds both the sensing tube and the shielding member.

Figure 10:
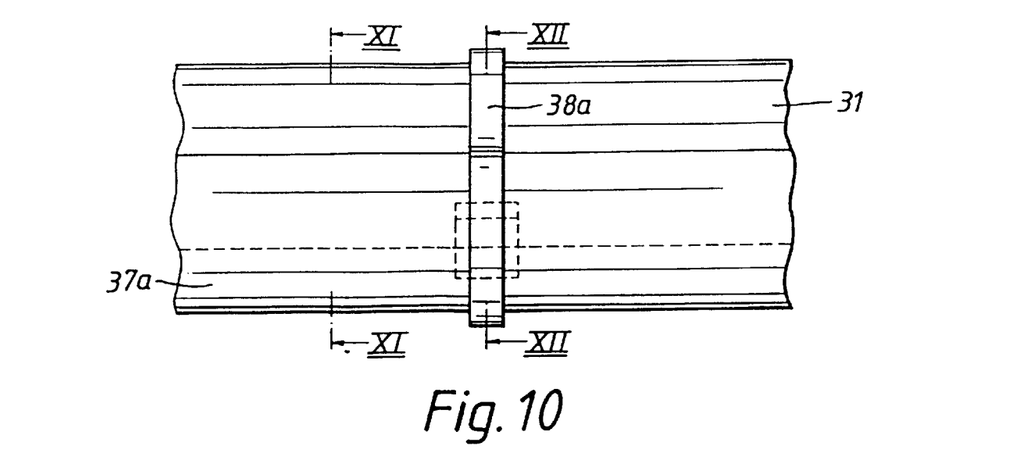
FIG. 10 is a side view, on the same scale as FIG. 7, of a part of a further form of sensor tube assembly.
Figure 11:
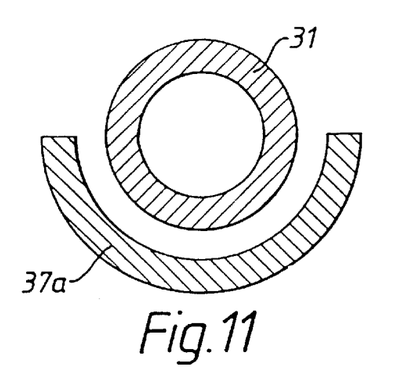
FIG. 11 is a cross-section taken on the line XI—XI of FIG. 10.
Figure 12:
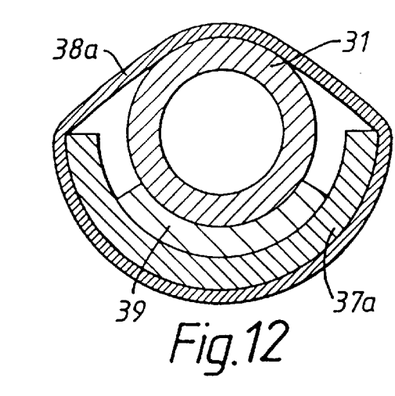
FIG. 12 is a cross-section taken on the line XII—XII of FIG. 10.

Although it is constructionally a little more complicated, it is preferable if the shielding member is spaced from the sensing tube, and such an arrangement is shown in FIGS. 10, 11 and 12. In that arrangement, a hemi-cylindrical shielding member 37a is spaced from the sensing tube 31, the radius of the inner surface of the shielding member being larger than the radius of the outer surface of the sensing tube. At intervals along its length, the sensing tube 31 and the shielding member 37a are held together by a metal strap 38a surrounding both the sensing tube and the shielding member. At each strap 38a, a part-cylindrical, thermally insulating (preferably, ceramic) spacer 39 is provided so that the shielding member 37a is there positively located with respect to the sensing tube 31.

Figure 13:
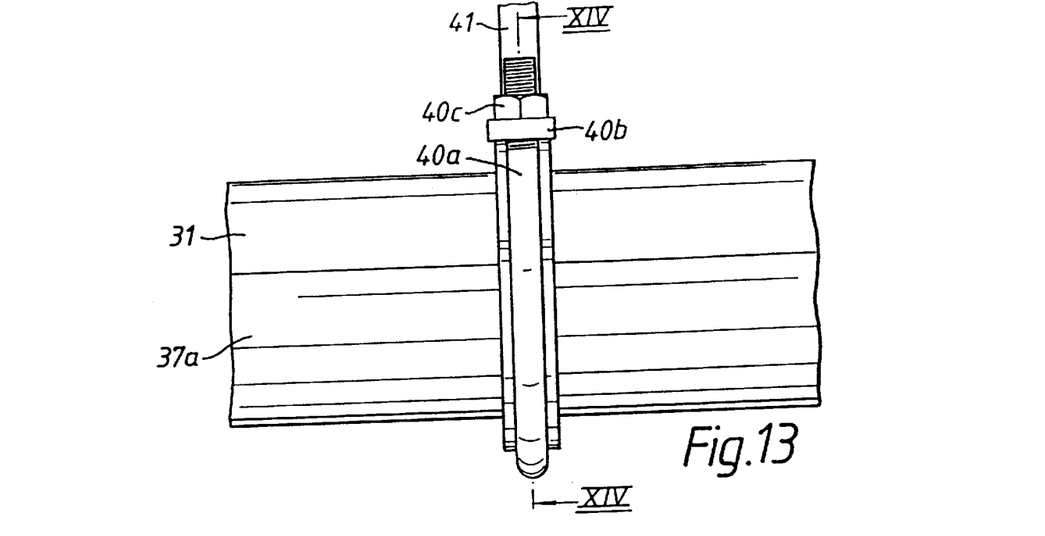
FIG. 13 is a side view, on the same scale as FIG. 10, of another part of the sensor tube assembly shown in FIG. 10.
Figure 14:
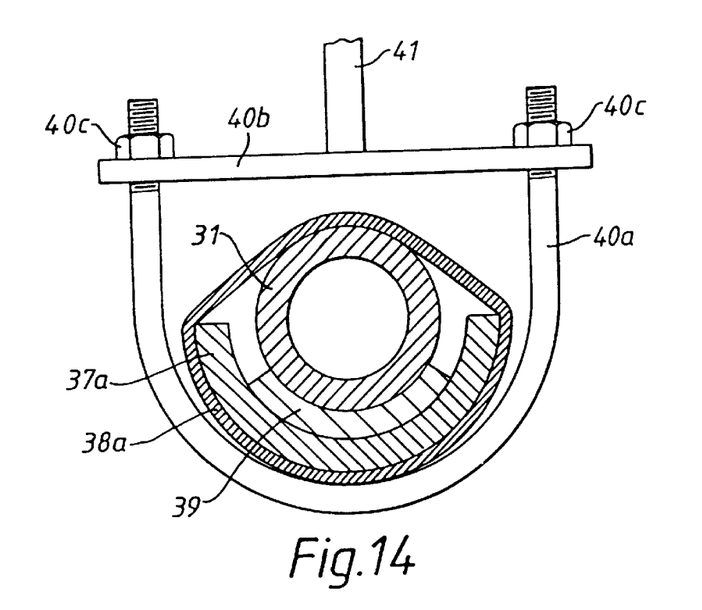
FIG. 14 is a cross-section taken on the line XIV—XIV of FIG. 13.

Each upper sensing tube 31 is held in position by suspending it from the roof 6 of the oven. Thus, as shown in FIGS. 13 and 14, some of the metal straps 38a are surrounded by collars made up from hoops 40a which are closed by plates 40b. Downward movement of the hoops 40a relative to the plates 40b is limited by nuts 40c, which are in screw-threaded engagement with end portions of the limbs of the hoops 40a. Welded to the plates 40b are shanks 41 which are secured to the top portion 6 of the wall of the oven. It will be noted that the arrangement allows each upper sensing tube 31 to undergo significant thermal expansion, such as could occur if the flow of liquid through the tubes were to be accidentally interrupted while the oven was in use.

Figure 6:
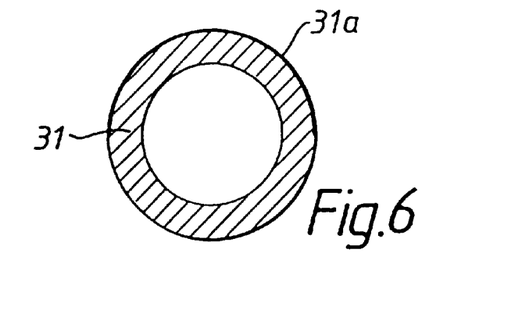
FIG. 6 is a transverse cross-section, on an enlarged scale, taken through one of the sensor tubes shown in FIG. 3.

While the sensing tube 31 shown in FIGS. 13 and 14 is provided with a shielding member 37a as shown in FIGS. 10, 11 and 12, the method of suspending the sensing tube 31 shown in FIGS. 13 and 14 can also be used when the sensing tube is provided with a shielding member 37 as shown in FIGS. 7, 8 and 9, or when, as shown in FIG. 6, no shielding means is provided.

Similarly, the lower sensing tubes 32, instead of (or in addition to) being externally blackened only below may also be provided with shielding members, which are supported from the bottom portion 8 of the wall 2 of the oven chamber 1. Those shielding members are arranged to shield the lower sensing tubes 32 from above. Thus, when they are viewed in transverse cross-section, the lower sensing tubes 32, and the associated shielding means, are as shown in FIGS. 8 and 9 or as shown in FIGS. 11 and 12, but inverted. The arrangement for supporting each lower sensing tube 32 is similar to that shown in FIGS. 13 and 14, except that the shank is secured, not to the plate, but to the lowermost part of the hoop, and the shank extends downwardly to the floor 8 of the oven), and the sensing tube rests on the hoop. In that arrangement, the nuts merely serve to retain the plate (while leaving room for the lower sensing tube 32 to expand).

In operation, a liquid is caused to flow through each upper sensing tube 31 and each lower sensing tube 32 at a constant rate by the pump or pumps 34. Because the consequence of any leakage from the sensing tubes 31 and 32 is, given that the material being heated consists of food products, less serious if the liquid flowing through them is water, that is the liquid used. The water is maintained under a pressure sufficient to ensure that it does not boil.

The temperature increase of the water as it flows through each of the sensing tubes 31 and 32 is measured, as by two thermocouples, one junction of each thermocouple being shown at 35 and 36, respectively. If the water were to boil during its passage through any of the sensing tubes 31 and 32, the measured temperature increase would be altered to a significant, but indeterminate extent.

In a tunnel oven of this kind, where the radiant heating greatly exceeds the convective heating, the heating of the sensing tubes 31 and 32 results very largely from radiative heat transfer from the flames issuing from the burners 17 and 18 and, to a lesser extent, from radiation emitted by the roof 6 and the floor 8 of the oven, respectively. Further, because the upper sensing tubes 31 are reflective below and/or shielded from below, while the lower sensing tubes 32 are reflective above and/or shielded from above, the temperature increase of water flowing through the upper sensing tubes 31 in a zone provides a measure of the heat flux radiating from the flames issuing from the upper burners 17 and the roof 6 of the oven in the zone, while the temperature increase of the water flowing through the lower sensing tubes 32 provides a measure of the radiant heat output from the lower burners 18 and the floor 8 of the oven in the zone.

It is found that, even when the processing means 29 is of the kind used when control of the oven is made dependent on measurements of the gas temperature within the oven, the replacement of means for measuring the gas temperature by the sensing means 28 as described above can greatly improve the performance of the oven. Further, as will now be explained, it is possible to arrange that such replacement can be made without having to replace the entire control means.

When, as is now common, the control of the oven is determined by the gas temperature within the oven, the temperature is usually measured by a thermocouple, and so the control means is arranged to receive as inputs signals from one or more thermocouples. In the case of the forms of apparatus described above with reference to the accompanying drawings, it is possible to arrange that the temperature of the water entering each of the sensing tubes 31 and 32 is kept constant, when the only measurement required is that provided by the thermocouple junction at the downstream end of the sensing tube (for example, the thermocouple junction 36). In that way, existing control systems can continue to be used if a thermocouple arranged to measure gas temperature within the oven is replaced by the sensing means 28 of the invention. Further, such replacement can significantly improve the performance of the oven, although some alteration of the control parameters will of course be required.

It has also been found that the sensing means 28 in which the sensing tubes 31 and 32 of each zone extend over at least substantially the whole length of the zone give significantly better results than are obtained if the existing means for measuring the gas temperature at one point (strictly, over a small area), or a few discrete points in the zone, are merely replaced by means for measuring the radiant heat flux at such a point or points. That is because the upper sensing tube 31 in the zone is subjected to radiation from all the upper burners 17 in the zone and from that part of the part of the roof 6 of the oven that is within the zone, whereas localised radiation sensors respond almost exclusively to the radiant heat sources that are in their immediate vicinity.

It has already been explained that the sensing means 28 may be varied in various ways, for example, in the precise way in which the sensing tubes 31 and 32 are shielded from below and above, respectively. The sensing means 28 may, however, also be modified in other ways.

Figure 4:
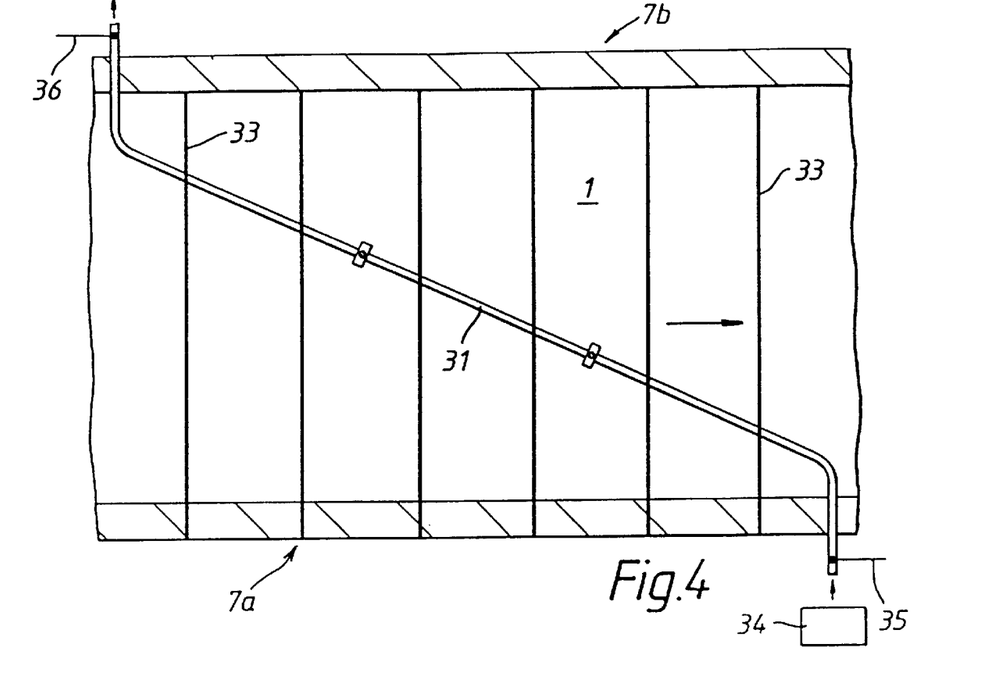
FIG. 4 is a diagrammatic plan view showing the configuration of one of the sensor tubes shown in FIG. 3.

It is clear that, with a sensing tube 31 having the configuration shown in FIG. 4, the temperature increase in water flowing through the tube will not be affected equally by a given change in the output of different ones of the upper burners 17 in the zone. That is because the temperature of the sensing tube 31 increases in the direction opposite to the direction of movement of the upper run 10 of the band 11 (which is in the direction shown by the arrow in each of FIGS. 1, 2, 4 and 5, that is to say, from left to right as seen in those FIGS.). The resulting weighting of the measurement can be kept within limits that will commonly be found to be acceptable by ensuring that the temperature of the water remains sufficiently low. Then, the difference in temperature between the flames from the upper burners 17 and the outer surface of the upper sensing tube 31 will be large by comparison with the variation in temperature of the outer surface of the sensing tube along its length. That is subject to the limitation, however, that the temperature of the outer surface of the upper sensing tube 31 must remain above the dew-point of the gas within the oven 1. Corresponding considerations apply to the lower sensing tubes 32.

Figure 5:
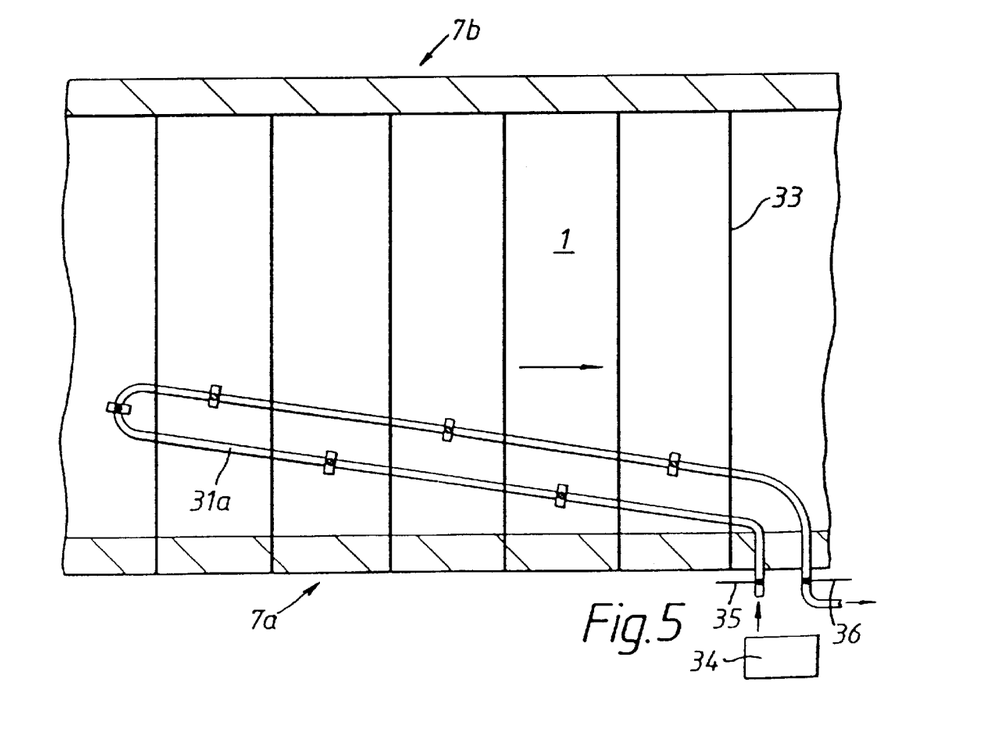
FIG. 5 is a diagrammatic plan view showing an alternative configuration for a sensor tube.

It is also possible to reduce the effect of the variation in the temperature of the outer surface of the upper sensing tube 31 along its length by using a sensing tube of a different configuration. In FIG. 5, there is shown an upper sensing tube 31a of which the configuration is such that the variation in the temperature of the tube along its length does not result in any significant weighting of the effect of the different upper burners 17 beneath which it passes. In the case of the upper sensing tube 31a, the inlet and outlet ends of the tube are situated close together and, instead of the direction of flow of the water in the tube having over almost all the length of the tube a component antiparallel to the direction of movement of the upper run 10 of the band 11, the direction of flow of the water through the tube has, over almost exactly one half of its length, a component antiparallel to that direction and, over the other half of its length, a component parallel to that direction. With that configuration of sensing tube, the average temperature of the water at adjacent points in the two limbs of the sensing tube 31a will vary only very little along the length of the zone, so that the weighting referred to above will be significantly reduced.

It will be observed that (see FIG. 5) the sensing tube 31a extends over only approximately one third of the width of the oven chamber 1. That has the advantage that it can be used in ovens where the presence of obstructions within the oven chamber would prevent the fitting of a sensing tube that extended further across the width of the oven. Other things being equal, however, it is desirable that the sensing tubes should extend as far across the width of the oven as possible, for in that way the angle between the direction in which the sensing tube extends and the direction in which the articles are transported through the oven is made as large as possible. As a rough guide, an angle of 15° or more will generally be found to be satisfactory.

The sensing tubes, being at a relatively low temperature, have a significant shielding effect on the radiation emanating from the burners and, when the oven is used for the baking of food products, sensing tubes that extend parallel to (or very nearly parallel to) the direction of movement of the food products can result in the food products being baked noticeably less along lines where they have passed directly below sensing tubes. The shielding effect of the sensing tubes is increased when, as described above, they are provided with shielding means, and then the angle of inclination of the tubes to the direction of travel of the articles needs to be larger if noticeably uneven baking is to be avoided.

The processing means 29 is arranged to receive and process separately the signals provided by the thermocouples 35 and 36 associated with each of the sensing tubes 31 and 32, and so to cause the operating means 30 to control the group of burners 17 or 18, respectively, that is associated with one of the sensing tubes separately from the group of burners associated with each of the other sensing tubes. The group of upper burners 17 that is associated with a given upper sensing tube 31 or 31a is made up of the burners that are located directly above that upper sensing tube. Correspondingly, the group of lower burners 18 that is associated with a given lower sensing tube 32 is made up of the burners that are located directly below that lower sensing tube. In the arrangement shown in FIG. 4, for example, there are six upper burners 17 (of which the positions are indicated schematically by the lines 33) associated with a single upper sensing tube 31. Commonly, a zone will contain from six to twenty upper burners 17, and from six to twenty lower burners 18. The number of upper burners 17, and the number of lower burners 18 in a zone, may vary from zone to zone. Further, the number of lower burners 18 in a zone may differ from the number of upper burners 17 in the zone.

The operating means 30 operates the control valves in the manifold 22 and the valves of the assemblies 20. Accordingly, the operating means 30 can control the supply of a combustible gaseous mixture to all the upper burners 17 associated with a single upper sensing tube 31. Similarly, the operating means 30 can control the supply of a combustible gaseous mixture to all the lower burners 18 associated with a single lower sensing tube 32. In addition, the operating means 30 can cut off completely (and restore) the supply of a combustible gaseous mixture to individual upper and lower burners 17 and 18, respectively.

The need to be able to cut off completely the supply of a combustible gaseous mixture to individual burners 17 and 18 arises, at least in part, because the rate of supply of gaseous mixture to a burner must not be reduced so far that the velocity of the gaseous mixture issuing from the burner is less than the speed of travel of the flame front. Accordingly, it may be impossible in certain circumstances to reduce sufficiently the total heat output of, say, all the upper burners 17 in a zone by operating the relevant control valve in the manifold 22. When that total heat output has been reduced as far as possible by operation of the relevant control valve in the manifold 22, any further reduction can be effected only by operating the valves of the assemblies 20 associated with the burners 17 in question to cut off completely the supply of combustible gas to one or more of the individual burners. If, as is common, flame detectors are provided, that will increase the minimum rate of supply of combustible gaseous mixture to the burners, because the flame detectors will indicate the absence of a flame at rates of supply of a combustible gaseous mixture that are more than sufficient to ensure that the velocity of the gaseous mixture issuing from the burners is significantly greater than the speed of travel of the flame front. Accordingly, when flame detectors are provided the probability that the assemblies 20 associated with one or more individual burners 17 will have to be operated to cut off the supply of combustible gas to the burners 17 in question will be increased.

Although it is, for example, for the reason explained above, sometimes convenient to use a thermocouple to measure the increases in the temperature of the water as it flows through the sensing tubes 31 (or 31a) and 32, platinum resistance thermometers may be used instead if the improved accuracy resulting from their use is found to be necessary or desirable.

As in known tunnel ovens of the kind intended for the baking of food products, the band 11 may be imperforate (for example, a band of mild steel) or it may be a mesh, depending largely on the nature of the items being baked. When the band 11 is a mesh, the lower burners 18 assume a greater importance because, instead of heating mainly the underside of the upper run 10 of the band, they heat the items being baked by direct radiative transfer. Also, with a mesh, the need for good shielding (and/or high reflectivity) of the undersides of the upper sensing tubes 31 and of the upper surfaces of the lower sensing tubes 32 is increased.

The oven itself may also be of a different construction. Thus, for example, the oven chamber 1 may be supplemented by a lower chamber through which the lower run 12 of the band 11 returns. Then, if desired, there may be provided additional burners, similar to the lower burners 18, arranged to preheat the underside of the lower run 12 of the band 11 immediately before it leaves the supplementary chamber. Thus, the band 11 is heated before it (that is to say, its upper run 10) receives the items to be baked.

When such preheating burners are used, the sensing means 28 may include sensing tubes, situated between those burners and the lower run 12 of the band 11, the sensing tubes being similar to the lower sensing tubes 32 (including having partial blackening or associated shielding).

The tunnel oven described above is to be regarded as a radiation oven because of the presence within the oven of radiant heating elements in the form of the burners 17 and 18. It does not cease to be a radiation oven if there are provided within the oven chamber 1 means for increasing somewhat the element of convection heating. Such means may, for example, (see FIG. 16) comprise tubes 42, which extend between adjacent burners (upper burners 17 are shown), and are provided with rows of perforations 42a and 42b extending along their lower sides. In the interests of clarity, the tubes 42 and the burners 17 are shown on a larger scale than is the spacing between them. Gas is taken from the oven chamber 1 and recycled to the oven chamber via the tubes 42. The gas supplied to the tubes issues from them in downwardly inclined directions from the perforations 42a and 42b, and causes turbulence, which enhances the convective heating of the articles, although not to such an extent that it becomes comparable with the radiative heating.

Although, in the forms of apparatus described with reference to the drawings, only one upper sensing tube 31 and only one lower sensing tube 32 is provided for each zone, additional upper and/or lower sensing tubes may be provided if desired.

The apparatus described with reference to the accompanying drawings may be varied in numerous other ways. For example, the burners 17 and 18 may be replaced by so-called high efficiency burners, which include ceramic elements that are arranged to be heated by the flames issuing from the burners. The hot ceramic elements then become the principal source of thermal radiation in the oven.

Also, referring to FIGS. 10, 11 and 12, the thermal insulation provided by the ceramic member 39 may instead be provided by metal studs or fins of small cross-sectional area provided on the shielding member 37a. Thus, a member (the ceramic member 39) having a large cross-sectional area, but made of a material having a low thermal conductivity, may be replaced by members having a small total cross-sectional area but made of metal, which has a high thermal conductivity.

It will be understood that, although the forms of tunnel oven described with reference to the accompanying drawings are baking ovens, the invention is not limited to tunnel ovens intended for use as, and/or used as, baking ovens. Further, because accurate control of the conditions prevailing within the oven is usually more important when the oven is use for baking food products than it is for other applications, the control systems described will usually be satisfactory for other applications. In fact, for some other applications, it will be found that some of the features described, for example, the inclination of the sensing tubes with respect to the direction of travel of the material to be heated, will not be necessary.

We claim:

1. A tunnel oven containing a plurality of transversely extending radiant heating elements arranged at intervals along the length of the oven, the oven being provided with means for transporting material to be heated through the oven, means for supplying energy to the radiant heating elements, at least one sensing tube extending within the oven, the or each sensing tube extending over a part of the length of the oven that contains at least two radiant heating elements that are spaced from each other along the length of the oven, the or each sensing tube being arranged to absorb radiation from its associated at least two heating elements, means for causing a liquid to flow through the or each sensing tube at a controlled rate, means for producing a signal that provides a measure of the temperature increase of the liquid resulting from its passage through the or each sensing tube within the oven, and means arranged to control the rate of emission of radiant heat by a radiant heating element or elements in accordance with the signal.

2. A tunnel oven as claimed in claim 1, wherein the radiant heating elements are situated above the path along which, in use, the material is transported through the oven, and wherein the or each sensing tube is situated below the radiant heating elements and above the path along which, in use, material to be heated is transported through the oven.

3. A tunnel oven as claimed in claim 2, wherein there is provided an additional, lower set of transversely extending radiant heating elements arranged at intervals along the length of the oven, the lower radiant heating elements being situated below the path along which, in use, material to be heated is transported through the oven, and wherein there is provided at least one additional, lower sensing tube situated above the lower radiant heating elements and below the path along which, in use, material to be heated is transported through the oven, and the or each lower sensing tube extends over a part of the length of the oven that contains at least two lower radiant heating elements, the or each lower sensing tube being arranged to absorb radiation from its associated at least two lower radiant heating elements, means for causing a liquid to flow through the or each sensing tube at a controlled rate, means for producing a signal that provides a measure of the temperature increase of the liquid resulting from its passage through the or each lower sensing tube within the oven, and means arranged to control the rate of emission of radiant heat by a lower radiant heating element or lower radiant heating elements.

4. A tunnel oven as claimed in claim 3, wherein there are provided a plurality of upper sensing tubes and a plurality of lower sensing tubes, the upper sensing tubes and the lower sensing tubes being distributed along the length of the oven, and there being provided means for causing a liquid to flow through all the sensing tubes, means for producing a signal indicative of the temperature rise in the liquid in each of the sensing tubes, and means for controlling the output of the radiant heating elements in accordance with the signals.

5. A tunnel oven as claimed in claim 4, wherein there are provided a plurality of upper sensing tubes and a plurality of lower sensing tubes, the upper sensing tubes together extend over substantially the entire length of the oven, and the lower sensing tubes together extend over substantially the entire length of the oven.

6. A tunnel oven as claimed in claim 3, wherein the outer surface of the or each upper sensing tube is radiation-absorbing above and radiation-reflecting below, and the outer surface of the or each lower sensing tube is radiation-absorbing below and radiation-reflecting above.

7. A tunnel oven as claimed in claim 3, wherein the or each upper sensing tube is provided with means arranged to shield it against radiation that would be incident on it from below, and the or each lower sensing tube is provided with means arranged to shield the sensing tube against radiation that would be incident upon it from above.

8. A tunnel oven as claimed in claim 1, wherein the or each sensing tube extends, as seen in plan, in a direction that is at an angle to the direction of movement of the material to be heated through the oven.

9. A tunnel oven as claimed in claim 8, wherein the or each sensing tube enters the oven at one side, extends diagonally across the oven, and leaves the oven at the other side.

10. A tunnel oven as claimed in claim 8, wherein the or each sensing tube enters the oven at one side, extends along a part of the length of the oven and across at least a part of the width of the oven, and returns substantially parallel to itself to leave the oven at the said one side.

11. A tunnel oven as claimed in claim 1, wherein the means for producing a signal that provides a measure of the temperature increase of the liquid resulting from its passage through the or each sensing tube within the oven comprises thermocouple means.

12. A tunnel oven as claimed in claim 1, wherein a plurality of sensing tubes is provided, each sensing tube being situated between (in a vertical direction) a group of adjacent radiant heating elements, and the path along which, in use, the material is transported through the oven, so that each sensing tube is associated with a group of radiant heating elements, and the control means is arranged to control the rate of emission of radiant heat by the radiant heating elements of each group of radiant heating elements in response to the signal that provides a measure of the temperature increase of the liquid that flows through the sensing tube with which those radiant heating elements are associated.

13. A tunnel oven as claimed in claim 1, wherein the means for transporting material through the oven is an endless band, the upper run of which extends through the oven and along the length of the oven and which provides a supporting surface for the material.

14. A tunnel oven as claimed in claim 13, wherein the endless band is imperforate.

15. A tunnel oven as claimed in claim 13, wherein the endless band is a mesh or is otherwise perforate.

16. A tunnel oven as claimed in claim 1, wherein the radiant heating elements are burners.

17. A tunnel oven containing a plurality of transversely extending radiant heating elements arranged at intervals along the length of the oven, the oven being provided with means for transporting material to be heated through the oven, means for supplying energy to the radiant heating elements, a sensing tube which extends within the oven over a part of the length of the oven that contains at least two radiant heating elements that are spaced from each other along the length of the oven, the sensing tube being arranged to absorb radiation from the said at least two heating elements, means for causing a liquid to flow through the sensing tube at a controlled rate, means for producing a signal that provides a measure of the temperature increase of the liquid resulting from its passage through the sensing tube within the oven, and means arranged to control the rate of emission of radiant heat by a radiant heating element or elements in accordance with the signal.

18. A tunnel oven as claimed in claim 17, wherein the radiant heating elements are situated above the path along which, in use, the material is transported through the oven, and wherein the said sensing tube is situated below the radiant heating elements and above the path along which, in use, material to be heated is transported through the oven.

19. A tunnel oven as claimed in claim 17, wherein there is an additional, lower set of transversely extending radiant heating elements arranged at intervals along the length of the oven, the lower radiant heating elements being situated below the path along which, in use, material to be heated is transported through the oven, and wherein there is provided an additional, lower sensing tube situated above the lower radiant heating elements and below the path along which, in use, material to be heated is transported through the oven, and the lower sensing tube extends over a part of the length of the oven that contains at least two lower radiant heating elements, the lower sensing tube being arranged to absorb radiation from the said at least two lower radiant heating elements, means for causing a liquid to flow through the or each sensing tube at a controlled rate, means for producing a signal that provides a measure of the temperature increase of the liquid resulting from its passage through the lower sensing tube within the oven, and means arranged to control the rate of emission of radiant heat by a lower radiant heating element or lower radiant heating elements.

20. A method of heating material, which comprises:
conveying the material through a tunnel oven containing a plurality of transversely extending radiant heating elements arranged at intervals along the length of the oven, the oven being provided with at least one sensing tube extending within the oven, the or each sensing tube extending over a part of the length of the oven that contains at least two radiant heating elements that are spaced from each other along the length of the oven, the or each sensing tube being arranged to absorb radiation from at least two associated heating elements;

supplying energy to the radiant heating elements;

causing a liquid to flow through the or each sensing tube at a controlled rate;

producing a signal that provides a measure of the temperature increase of the liquid resulting from its passage through the or each sensing tube within the oven; and controlling the rate of emission of radiant heat by a radiant heating element or elements in accordance with the signal.

21. A method as claimed in claim 20, wherein the material is a food material, and the heating effects baking of the material.

* * * * *